(12) United States Patent
Emami-Neyestanak et al.

(10) Patent No.: US 7,602,869 B2
(45) Date of Patent: Oct. 13, 2009

(54) METHODS AND APPARATUS FOR CLOCK SYNCHRONIZATION AND DATA RECOVERY IN A RECEIVER

(75) Inventors: Azita Emami-Neyestanak, New York, NY (US); Mounir Meghelli, Tarrytown, NY (US); Benjamin D. Parker, Peekskill, NY (US); Sergey V. Rylov, White Plains, NY (US); Alexander V. Rylyakov, Mount Kisco, NY (US); Jose A. Tierno, Stamford, CT (US)

(73) Assignee: International Business Machines Corporation, Armonk, NY (US)

( * ) Notice: Subject to any disclaimer, the term of this patent is extended or adjusted under 35 U.S.C. 154(b) by 624 days.

(21) Appl. No.: 11/193,868

(22) Filed: Jul. 29, 2005

(65) Prior Publication Data
US 2007/0025483 A1 Feb. 1, 2007

(51) Int. Cl.
*H04L 7/00* (2006.01)
(52) U.S. Cl. ..................................... 375/355
(58) Field of Classification Search ................. 375/355
See application file for complete search history.

(56) References Cited

U.S. PATENT DOCUMENTS

| | | | | |
|---|---|---|---|---|
| 7,092,471 B2* | 8/2006 | Lentine et al. | ............... | 375/371 |
| 7,167,534 B2* | 1/2007 | Nakamura | ................... | 375/373 |
| 7,221,723 B2* | 5/2007 | Walker | ........................ | 375/376 |
| 7,310,397 B2* | 12/2007 | Smith et al. | ................. | 375/376 |
| 2002/0138540 A1* | 9/2002 | Enam | ......................... | 708/835 |
| 2004/0203559 A1* | 10/2004 | Stojanovic et al. | .......... | 455/403 |
| 2004/0264615 A1* | 12/2004 | Ho et al. | ..................... | 375/355 |
| 2006/0280272 A1* | 12/2006 | Stojanovic | .................. | 375/355 |
| 2007/0002989 A1* | 1/2007 | Song | ......................... | 375/355 |

OTHER PUBLICATIONS

Savoj, J.; Razavi, B., "Design of half-rate clock and data recovery circuits for optical communication systems," Proceedings of Design Automation Conference, 2001, pp. 121-126.*

(Continued)

*Primary Examiner*—Mohammad H Ghayour
*Assistant Examiner*—Nader Bolourchi
(74) *Attorney, Agent, or Firm*—Anne V. Dougherty; Ryan, Mason & Lewis, LLP (57) ABSTRACT

Clock synchronization and data recovery techniques are disclosed. For example, a technique for synchronizing a clock for use in recovering received data comprises the following steps/operations. A first clock (e.g., a data clock) is set for a first sampling cycle to a first phase position within a given unit interval in the received data. A second clock (e.g., a sweep clock) is swept through other phase positions with respect to the first phase position such that a transition from the given unit interval to another unit interval in the received data is determined. A sampling point is determined based on measurements at the phase positions associated with the second clock. The second clock is set to the phase position corresponding to the sampling point such that data may be recovered at that sampling point. Further, for a next sampling cycle, the first clock may be used to sweep through phase positions with respect to the set phase position of the second clock corresponding to the sampling point in the first sampling cycle such that a next sampling point may be determined.

20 Claims, 10 Drawing Sheets

OTHER PUBLICATIONS

R. Farjad-Rad et al., "A 0.3-µm CMOS 8-Gb/s 4-PAM Serial Link Transceiver," Symposium on VLSI Circuits Digest of Technical Papers, pp. 41-44, 1999.

S. Sidiropoulos, "A Semidigital Dual Delay-Locked Loop," IEEE Journal of Solid-State Circuits, vol. 32, No. 11, pp. 1683-1692, Nov. 1997.

* cited by examiner

RAW RESULTS:   (A)
1111010101110101111111111111011100101011011111111111110111

IDEAL RESULTS:   (B)
1111000000000001111111111111100000000000000011111111111110000

METHODS AND APPARATUS FOR CLOCK SYNCHRONIZATION AND DATA RECOVERY IN A RECEIVER

FIELD OF THE INVENTION

The present invention relates generally to data receiver architectures and, more particularly, to data receiver architectures that implement improved clock synchronization and data recovery techniques.

BACKGROUND OF THE INVENTION

High bandwidth chip-to-chip interconnection, also referred to herein as a "link," is a crucial part of many systems today. It is to be understood that the term "chip" is used herein to generally refer to an integrated circuit. High speed inputs/outputs (I/Os) are extensively used in server processors, memory-central processing unit (CPU) interfaces, multiprocessor systems, and gaming applications. With increasing speed of on-chip data processing, there is an increasing demand for higher data rates and higher number of I/O pins per chip.

However, limitations on power consumption, area per I/O, channel bandwidth, as well as the characteristics of advanced submicron complementary metal oxide semiconductor (CMOS) technologies, make design extremely challenging. Reducing power consumption, having a technology-friendly design and ability to monitor the channel, test and diagnose the problems in the link are among the most important requirements of these systems.

In particular, data recovery and synchronization at the receiver side is very important, but can consume a significant amount of power. For example, in a source synchronous application, a clock signal is sent along with the data from a source (e.g., a first chip) to a destination (e.g., a second chip). In such an application, the clock may be recovered at the receiver, and then the data, by properly adjusting the phase of the clock to be in synchronization with the data.

There are a number of different receiver architectures that are used for such applications. A widely-used synchronization technique involves sampling the input waveform more than once per bit time, see, e.g., R. Farjad-Rad et al., "A 0.3-um CMOS 8-Gb/s 4-PAM Serial Link Transceiver," IEEE Symposium on VLSI Circuits, June 1999. Such sampling typically includes one sample in the middle of the bit and one extra sample at the edge, where the transitions take place. The edge sampling provides phase information for phase recovery as part of a Delay Locked Loop (DLL) or Phase Locked Loop (PLL) to generate a clock in-phase with the incoming data. One way to design the PLL is to have a local DLL that generates the multi-phases and then uses interpolators to build a phase rotator system, see, e.g., S. Sidiropoulos et al., "A Semidigital Dual Delay-Locked Loop," IEEE Journal of Solid-State Circuits, November 1997.

However, there are several drawbacks to existing solutions. For example, the analog content of DLLs and PLLs makes the design challenging and less technology-friendly due to errors associated with phase detectors and leakage in the filter capacitors. Further, in order to monitor the link, extra samples are required, which adds to power consumption and area. Still further, the static phase offset between the sampling phases reduces the timing margin of the link.

Accordingly, a need exists for improved clock synchronization and data recovery techniques.

SUMMARY OF THE INVENTION

The above discussed and other drawbacks and deficiencies of the prior art are overcome or alleviated by improved clock synchronization and data recovery techniques according to principles of the present invention.

For example, in one aspect of the invention, a technique for synchronizing a clock for use in recovering received data comprises the following steps/operations. A first clock (e.g., a data clock) is set for a first sampling cycle to a first phase position within a given unit interval in the received data. A second clock (e.g., a sweep clock) is swept through other phase positions with respect to the first phase position such that a transition from the given unit interval to another unit interval in the received data is determined. A sampling point is determined based on measurements at the phase positions associated with the second clock. The second clock is set to the phase position corresponding to the sampling point such that data may be recovered at that sampling point.

Further, for a next sampling cycle, the first clock may be used to sweep through phase positions with respect to the set phase position of the second clock corresponding to the sampling point in the first sampling cycle such that a next sampling point may be determined. The clock used to sweep across phase positions may be sweepable over about two unit intervals.

Advantageously, illustrative embodiments of the present invention provide for using a clock phase that can sweep across two bits and that provides information about the position of transition edges. A loop may then be used to determine where the best sampling point is located. After each sweep cycle, the sweep clock phase may be set to this best possible sampling location and recovery of the data started. Then, the clock phase which was fixed and used to recover the data may become the new sweeping phase and gathering of information starts for the next update. This switching of functions between these two phases is referred to herein as a ping-pong action.

These and other objects, features and advantages of the present invention will become apparent from the following detailed description of illustrative embodiments thereof, which is to be read in connection with the accompanying drawings.

DETAILED DESCRIPTION OF PREFERRED EMBODIMENTS

As will be illustratively explained herein, principles of the present invention provide a receiver architecture that uses two samples per bit in order to accomplish clock synchronization and data recovery. However, instead of having a fixed extra sample at the data bit edge/transition, as is known and described above (see, e.g., R. Farjad-Rad et al., "A 0.3-um CMOS 8-Gb/s 4-PAM Serial Link Transceiver," IEEE Symposium on VLSI Circuits, June 1999), techniques of the invention provide for using a clock phase that can sweep across two bits and that provides information about the position of transition edges. A fully digital loop then finds out where the best sampling point is located. After each sweep cycle, the sweep clock phase is set to this best possible sampling location and data recovery starts. Then, the clock phase which was fixed and used to recover the data becomes the new sweeping phase and starts gathering information for the next update. This switching of functions between these two phases is referred to herein as a "ping-pong" action.

Many advantages flow from such recovery and synchronization techniques. By way of example, with a fully digital design, no analog DLL is needed for multi-phase generation. That is, the ping-pong action allows use of a digitally controlled delay line of two bit unit-intervals (UIs) and phase stitching even for clock/data recovery (CDR) applications. Thus, with such techniques, a loop filter is not required and the problems of phase detector error and leakage current in the filter capacitor are not present. Further, the sweep action always finds the best sampling point without making an assumption about the exact phase relationship existing between the two clocks. In contrast, the data and edge sampling clocks are assumed to have a well defined phase relationship in existing approaches. Still further, with the techniques of the invention, there is no static phase offset problem between the data clock and the phase clock. Also, the sweep action advantageously allows for monitoring of the link. Furthermore, the loop information can be used to fine adjust the delay line to two UIs on-the-fly.

It is to be understood that a "unit interval" or UI is the total time associated with one data bit and typically includes, at the received side, one open eye region (or low-bit-error-rate region) plus one data bit transition region.

Figure 1:
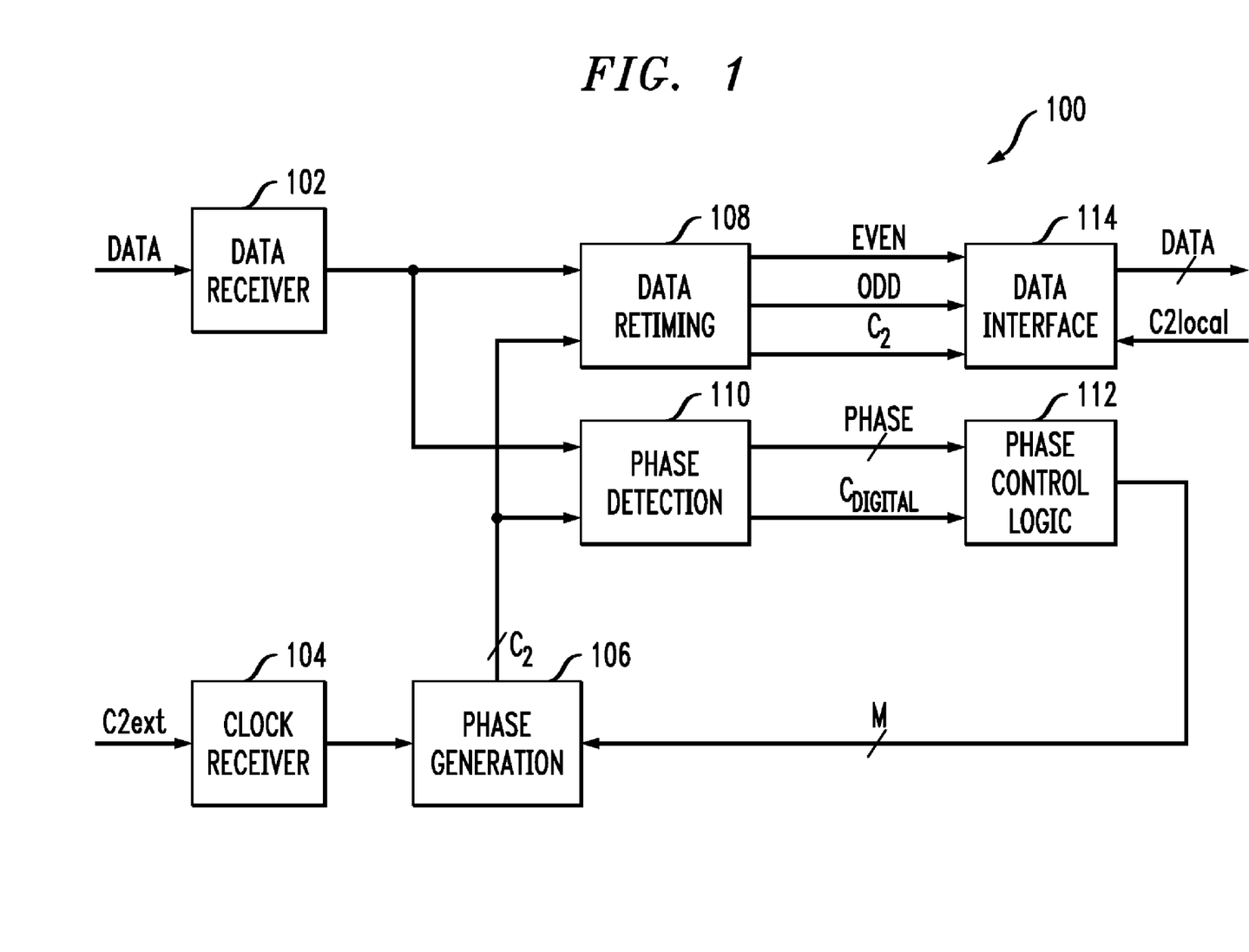
FIG. 1 is a block diagram illustrating a high level receiver architecture in which techniques of the present invention may be implemented.

Referring initially to FIG. 1, a block diagram illustrates a high level receiver architecture in which techniques of the present invention may be implemented.

As shown, "C2ext" and "Data" signals are both sent from the transmitter side through the channel to the receiver. The data receiver block 102 and the clock receiver block 104 are the analog front-ends preferably with signal amplification and equalization capabilities. The phase of the received clock (C2ext) is adjusted using a digitally-controlled phase generation block 106, which can be an adjustable delay line or a phase interpolator, by way of some examples. The received data is retimed and latched using the adjusted clock (C2).

It is important that the clock phase is set to minimize the probability of error at this data recovery (retiming) stage 108. The task of the phase detection block 110 is to provide information for correcting the clock phase by using both data and clock as inputs. It is in the phase detection block in which the techniques of the invention may be implemented. Phase control logic 112 processes the information from the phase detection block 110 (i.e., Phase signal and Cdigital signal) to control and adjust the phase of the incoming clock (using adjustment signal M). One important design goal here is to reduce the analog content of the design as much as possible and use digital blocks to implement this system.

Figure 2A:
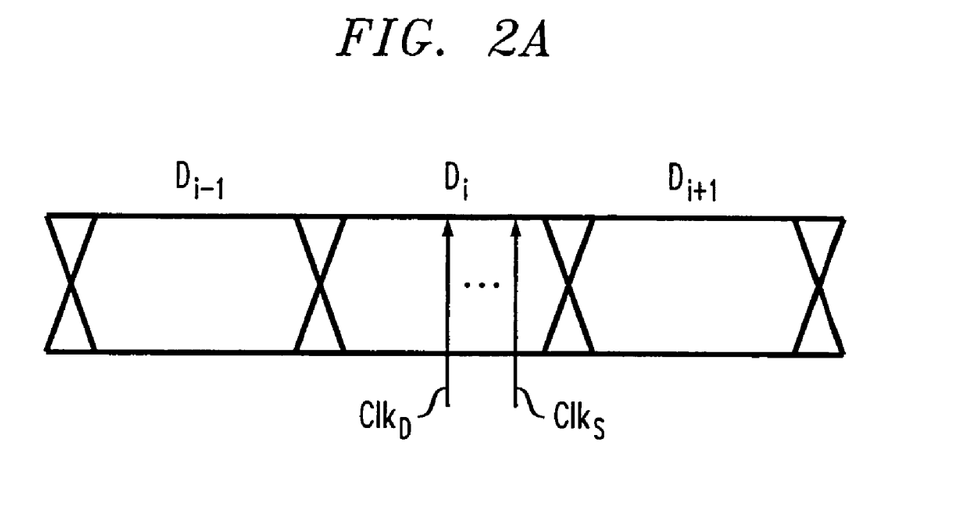
FIGS. 2A and 2B are timing diagrams generally illustrating a clock synchronization technique, according to an embodiment of the invention.
Figure 2B:
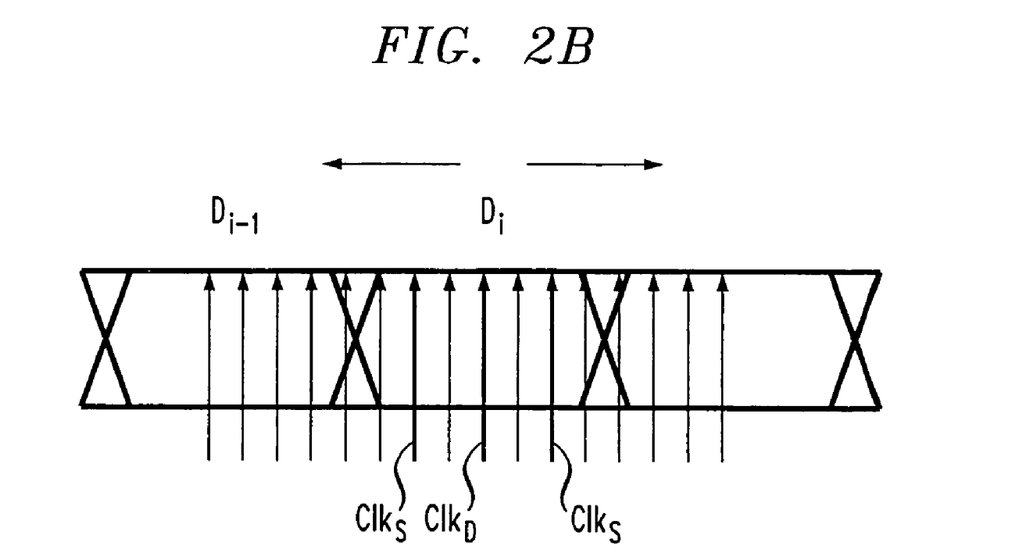

Referring now to FIGS. 2A and 2B, data eye timing diagrams generally illustrate a clock synchronization (phase adjustment) technique, according to an embodiment of the invention.

As shown in FIG. 2A, from the perspective of a serial stream of data bits ($D_{i-1}$, $D_i$, $D_{i+1}$), the clock synchronization technique of the invention provides for generating two clock phases per bit time. That is, $Clk_D$, referred to as the data clock, is generated and samples $D_i$. $Clk_S$, referred to as the sweep clock, is generated and samples $S_i$. For the present sweep interval, $Clk_D$ is fixed and $Clk_S$ is used to profile the data eye. $Clk_S$ thus creates an extra sample in each bit interval, whose sample time slowly sweeps across the eye over the course of the sweep interval.

While illustrative embodiments of the invention refer to received serial data streams, it is to be understood that the received data could be received via a parallel port.

It is to be understood that the eye can be swept in many ways. By way of example only, the synchronization technique of the invention may employ a focused inner eye sampling or "walk across" the entire eye. Sweeping of the data eye is programmable via a digital sweep controller (as will be further described below in the context of Finite State Machine 424 in FIG. 4). As will be seen in FIG. 2B, the technique then switches the function of the two clocks, i.e., "ping-ponging" between the two clocks.

As shown in FIG. 2B, the sweeping and ping-ponging operations are performed in the following manner:

1. At startup, set $Clk_D$ approximately in the middle of the eye.
2. Sweep $Clk_S$ to cover one transition edge on each side of $Clk_D$:
   Move $Clk_S$ forward, compare $S_i$ (sweep) with $D_i$ (data), only if transition ($D_i \neq D_{i+1}$)
   Move $Clk_S$ backward, compare $S_i$ with $D_i$, only if transition ($D_i \neq D_{i-1}$)
3. Gather, filter and store the results for each phase location.
4. Reconstruct the two edge positions around $Clk_D$.
5. Adjust $Clk_S$ to the best position within the data bits.
6. Switch the function of $Clk_S$ and $Clk_D$, i.e., ping-pong action.
7. Repeat steps 2-6.

It is to be appreciated that in step 2, there may be specific sweep intervals when this cannot actually be accomplished. But, this condition is automatically rectified at the onset of the next sweep interval.

Figure 3:
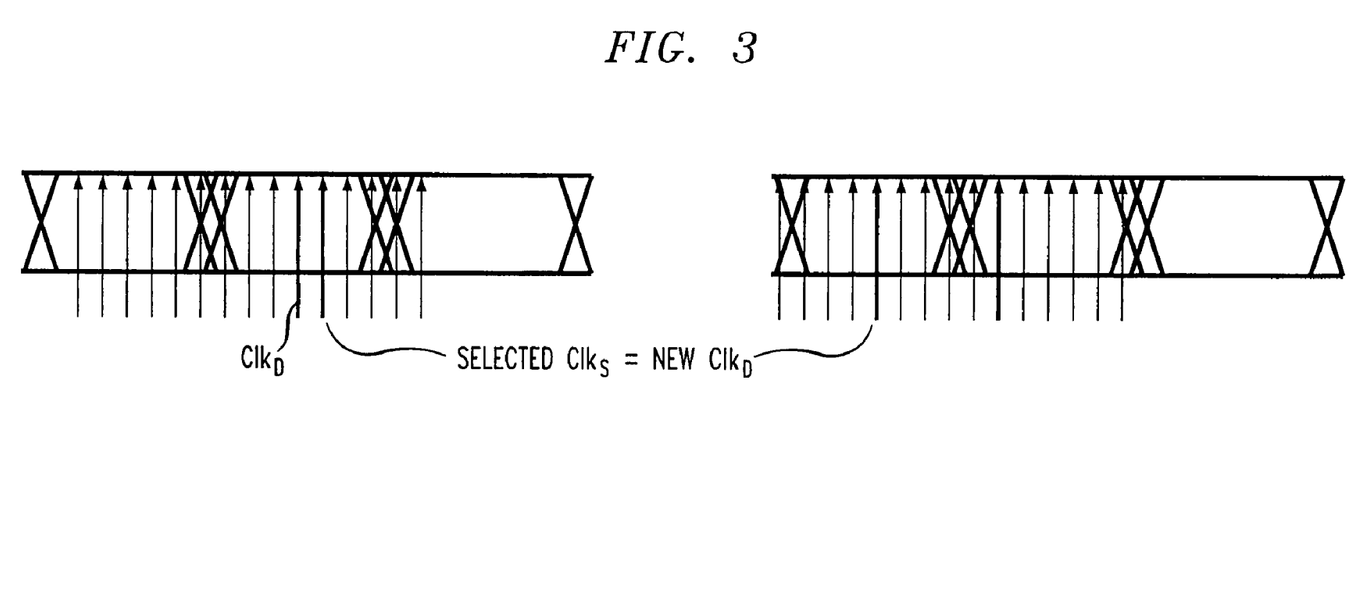
FIG. 3 is a timing diagram further illustrating a clock ping-ponging operation, according to an embodiment of the invention.

Referring now to FIG. 3, in accordance with the ping-ponging action of the invention, the selected $Clk_S$ becomes the $Clk_D$ for the next sampling period. It is to be appreciated that such ping-ponging action may be accomplished at the update rate of the loop used to determine the location of the best sampling point. Thus, the technique serves to always keep the clock at the best sampling time. Many advantages are realized in accordance with the technique, for example:

(i) No assumption that the best sampling time is in the middle of the unit interval, but rather assumes that the best sampling time is in the middle of an error-free zone (i.e., no mismatch or mismatch-free region). It is to be understood that while the phrases "error-free" or "mismatch-free" are used, the region or zone can be a low error region or zone (i.e., substantially mismatch-free). In a conventional edge detection technique, it is assumed that the best sampling time is exactly in the middle of the bit time defined as half bit-time away from edge samples, assuming that the eye diagram is symmetrical. But, there is no such an assumption in this technique.

(ii) No in-phase (I) quadrature phase (Q) clocking issue and no static timing error. Again, in a conventional edge detection technique, it is crucial that the phase difference between the main clock and edge clock be a well defined number of unit intervals, e.g., ½ UI. In the sweep/pingpong approach, since the sweep is done independently for each phase, the best sampling time is found independently for each phase and no accurate matching between the two is required.

(iii) Solves phase stitching with an open-loop 2UI delay line. Conventional open loop delay lines can not track large skews or frequency differences between the incoming clock and data. Using the ping pong action allows unlimited skew correction and a certain frequency difference limited by the bandwidth of the loop.

Figure 4:
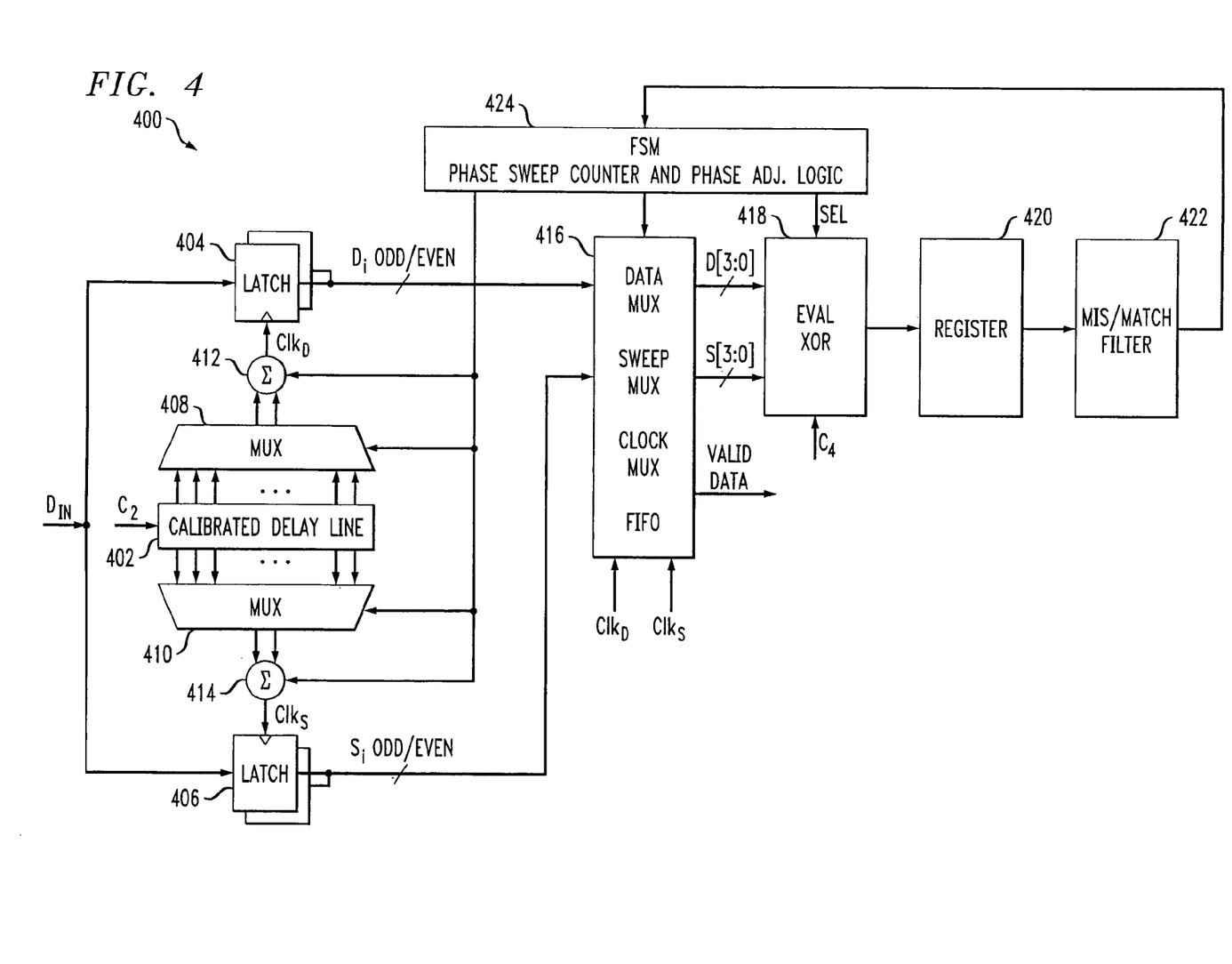
FIG. 4 is a diagram illustrating a top level block diagram of a sweep/ping pong receiver, according to an embodiment of the invention.

Referring now to FIG. 4, a top level block diagram is shown of a sweep/pingpong receiver 400 according to an embodiment of the invention. Here we assume that we have a half-rate architecture meaning that the frequency of the incoming clock and data recovery clock is half of the data rate.

The calibrated delay line 402 provides equally spaced clock phases over about 2UIs. At any given time, one of the two sets of latches (404, 406) is allocated for the data path and the other for the sweep path. FIG. 4 shows one possible way of generating the data and sweep clocks, using clock multiplexers (408, 410) and interpolators (412, 414). The multiplexer or mux (408, 410) selects two consecutive coarse phases generated by the delay line 402 and the interpolator (412, 414) generates the fine/accurate phase ($Clk_D$, $Clk_S$). In an alternative method, the fine phases could be generated using fine tuned, adjustable delay elements in the clock path.

The output of the set of latches (404, 406) is sent to the next stage to select which line is the data and which one is the sweep. The proper clock used for data retiming is also selected in this stage. Selection is accomplished in accordance with block 416. The resulting data (D) and sweep (S) are sent to Eval XOR block 418, where the sweep is evaluated by the data to determine whether the sweep clock is inside the eye or in the transition/noisy region. The measurement at each phase step of the sweep is done for a number of bits (32 bits or more) to gather enough statistics.

The result for each phase step is stored in register 420. The filtering over these results is done by Mis/Match filter 422, which is a simple Finite State Machine (FSM). In this example, we are assuming 64 phase steps for a complete maximum sweep. The main FSM 424, called here "FSM, Phase Sweep Counter & Phase Adj. Logic," governs the sweep action as well as final adjustment of data phase and ping pong action by controlling the phase mux/interpolators and other muxes in the system. This block may also reset different stages and determine the UI size for calibrating the delay line.

Figure 5:
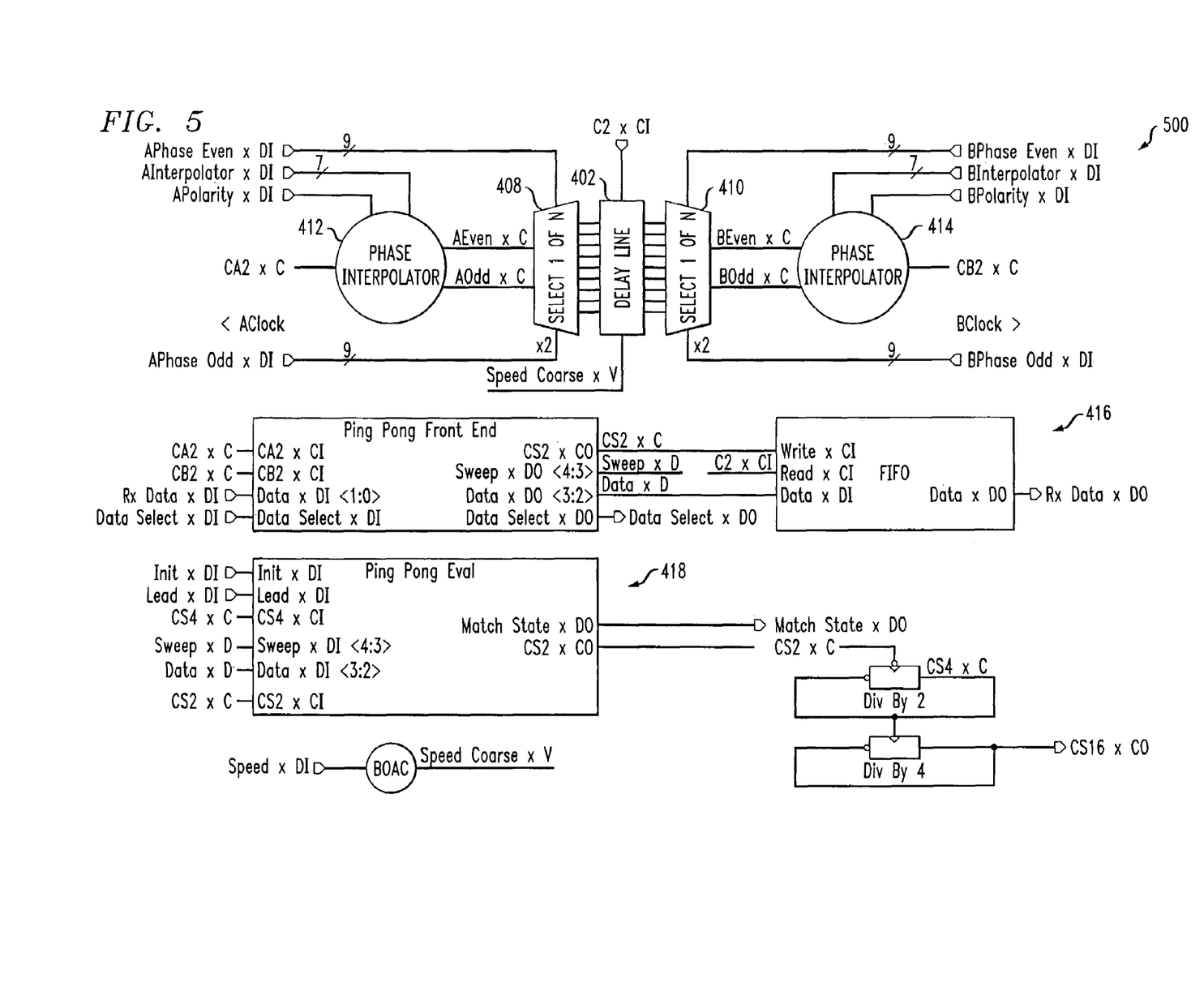
FIG. 5 is a diagram illustrating a top level schematic of an implementation of a receiver, according to an embodiment of the invention.

Referring now to FIG. 5, a diagram illustrates a top level schematic of an implementation of a receiver, according to an embodiment of the invention. Implementation 500 includes the delay line (402 in FIG. 4) and interpolators (412, 414 in FIG. 4) for the two clock phases, the front-end for data and sweep retiming (part of 416 in FIG. 4), the evaluation block (418 in FIG. 4) for phase recovery and the FIFO (part of 416 in FIG. 4).

Figure 6:
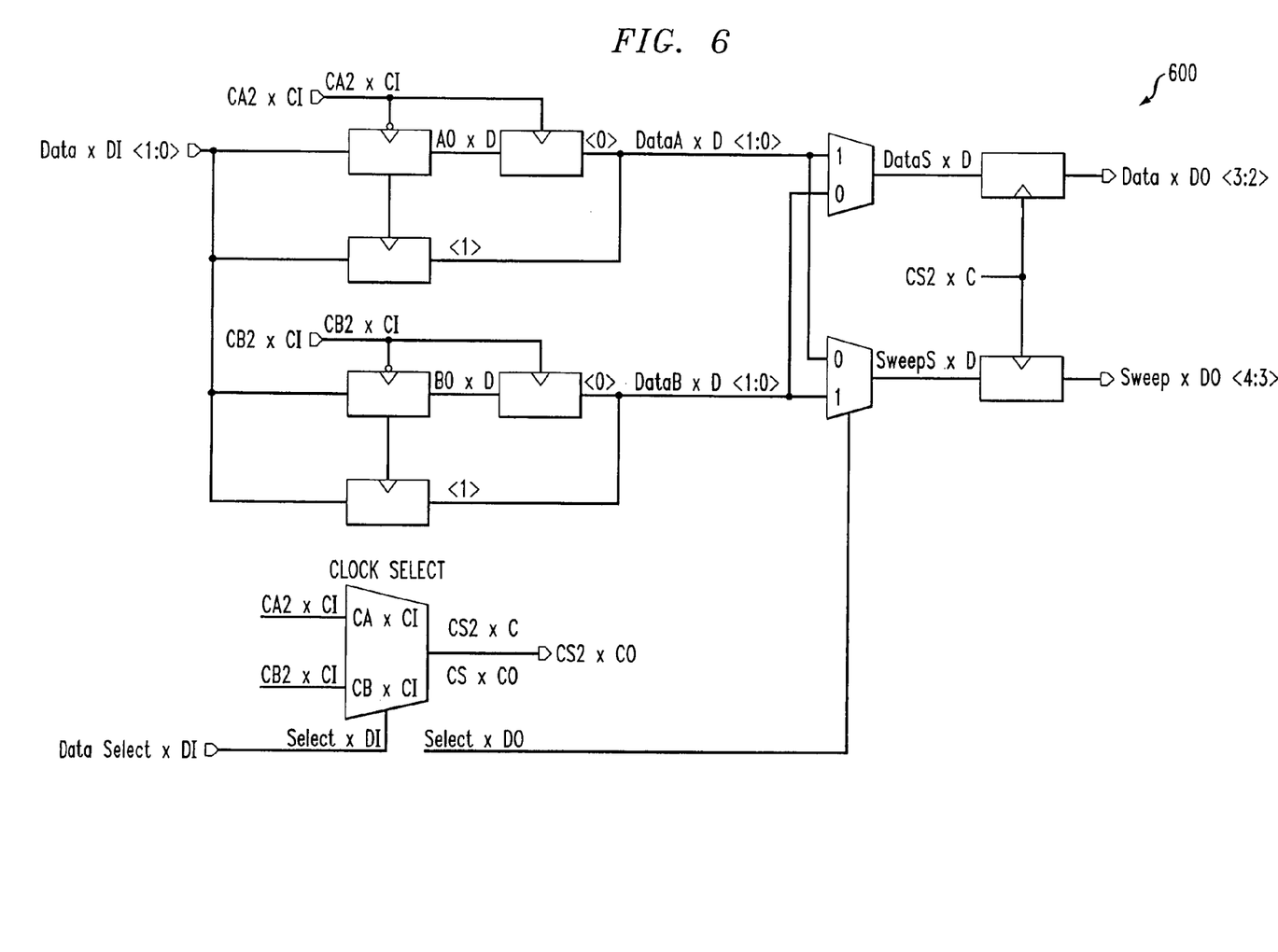
FIG. 6 is a diagram illustrating details of a front-end block, according to an embodiment of the invention.

Referring now to FIG. 6, a diagram illustrates details of a front-end block 600 (part of 416 in FIG. 4), according to an embodiment of the invention. This is a half-rate architecture. Thus, two sets of odd and even clocks and latches are used for each of the paths (one path for data and one path for sweep). The two clock phases CA and CB are used for clocking the latches in each path. Two muxes are used to select which path is data and which is the sweep at any given time. The muxes are toggled by the DataSelect signal. The generation of this signal is described below.

A challenging problem in this stage is the alignment of the data and sweep signals. It is important that the paths are retimed to the same clock phase, so that the sweep can be processed and evaluated with the data. Since the sweep phase is arbitrary compared to the data phase and has a phase difference of up to +/−1UI, the phase alignment, as well as dropping and adding a bit when we move from one UI to the other, poses an interesting problem. We found a very efficient solution to this problem with minimum hardware overhead.

Figure 7:
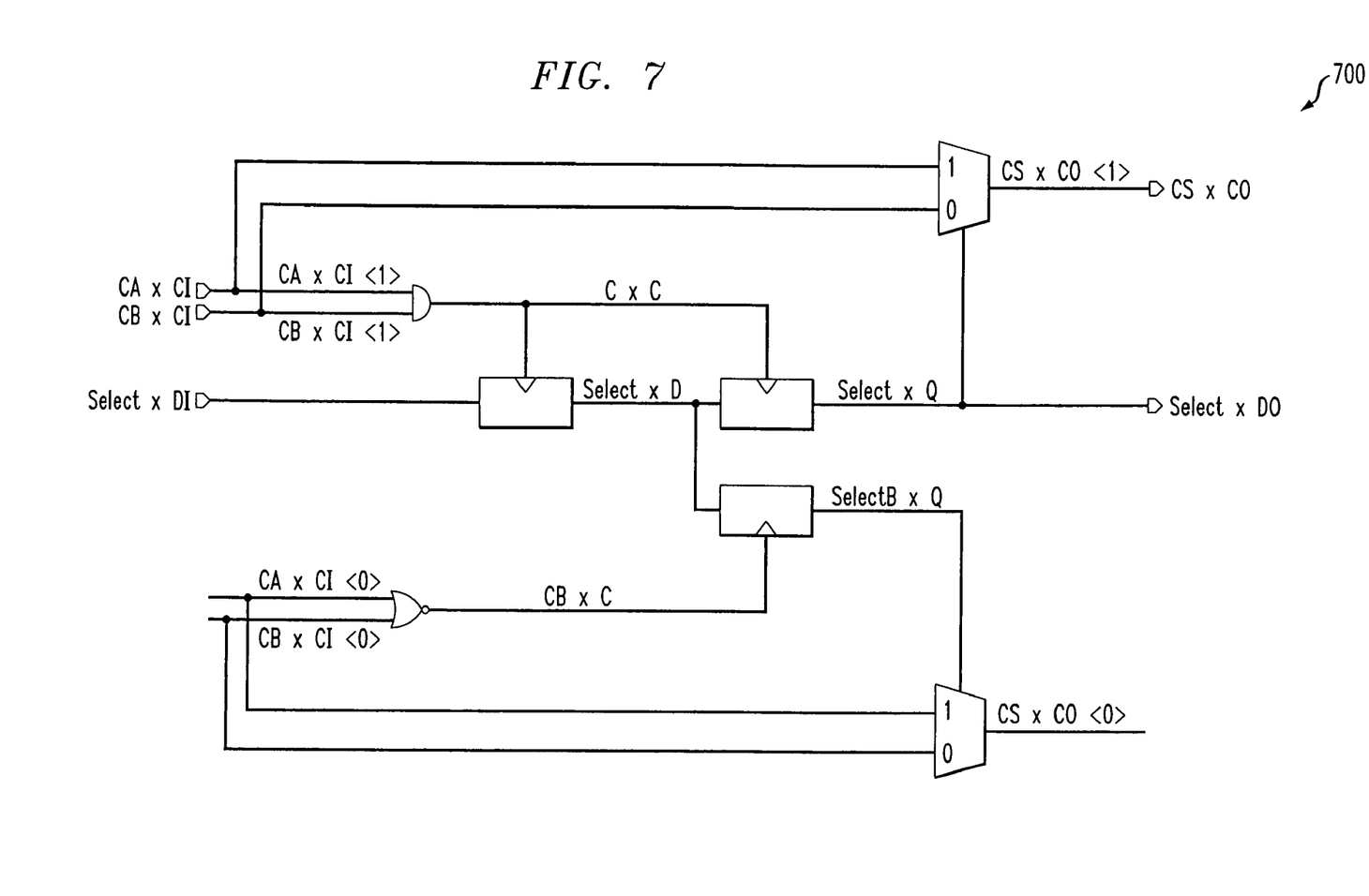
FIG. 7 is a diagram illustrating a more detailed implementation of a ClockSelect block, according to an embodiment of the invention.

As shown in FIG. 6, the data and sweep signal are both retimed to the CS2 clock domain at the last stage. CS2 is in fact the same clock as the clock for the path chosen for receiving the data. This clock is selected by the block named as ClockSelect in FIG. 6. The details of this block are shown in FIG. 7 and explained below. As mentioned above, CA and CB are half rate clocks, thus they are named CA2xC and CB2xC in the schematic, representing true and complement of clock phases A and B.

In order to be able to capture the sweep signal (SweepSxD) with the selected data clock (CS2xCO), we need enough timing margin to avoid meta-stability and error in latching. At the beginning of each sweep cycle, the two clock phases are both aligned to the middle of the eye. Then, the sweep phase is incremented one step at a time. Since, at the beginning of the sweep cycle, the two clock phases A and B are very close to each other, assuming a minimum eye-opening, the signal value of data and sweep should be the same. Moreover, the result of the sweep (SweepSxD) can be captured safely with CS2xC when the polarity of the sweep clock and data clock are set to be opposite.

Now, assume that we start the sweep and move the clock in either of a forward or a backward direction. With a certain eye-opening, we continue to register equal data and sweep values, but as we get close to the edge of the eye (transition region), eventually the value of the data and sweep will be different. At this point, we know that the sweep clock is moving through the edge and to the next eye. Moving to the next eye, we should account for dropping or adding a bit with respect to the data stream to keep the two streams synchronized. We achieve this by simply switching between the true and complement phase of the sweep clock. We call this action "polarity switch."

In summary, by receiving the first mismatch between the sweep and data stream, we switch the polarity for the sweep path and thus we guarantee having enough timing margin for bringing the sweep to the data time domain and to add/drop a bit moving to the next eye. The polarity switch automatically ensures that the sweep signal is evaluated to the corresponding data (the next bit or the previous bit). When the sweep in one direction is complete, the sweep clock is set back to be equal to data clock, polarity is set to be opposite of data clock, and we start the sweep to the other direction and we repeat the same procedure. The switching of the polarity of the clock is done through the interpolator control signal.

Referring now to FIG. 7, a diagram illustrates a more detailed implementation 700 of the ClockSelect block (FIG. 6). Upon the ping pong action, one of the clock phases A and B is chosen for data retiming. As mentioned above, that clock is used to bring both data and sweep streams into the same time domain. Therefore, we select the data clock and change it after a sweep period is complete. In order to switch from one clock to the other, we make sure that the select signal of the clock muxes shown in FIG. 7 (SelectxQ) toggles when the two clocks have the same value, in order to avoid any glitches in the clock. The logic shown in FIG. 7 ensures that the select toggles only when the true and complement of the clocks have the same values respectively.

Figure 8:
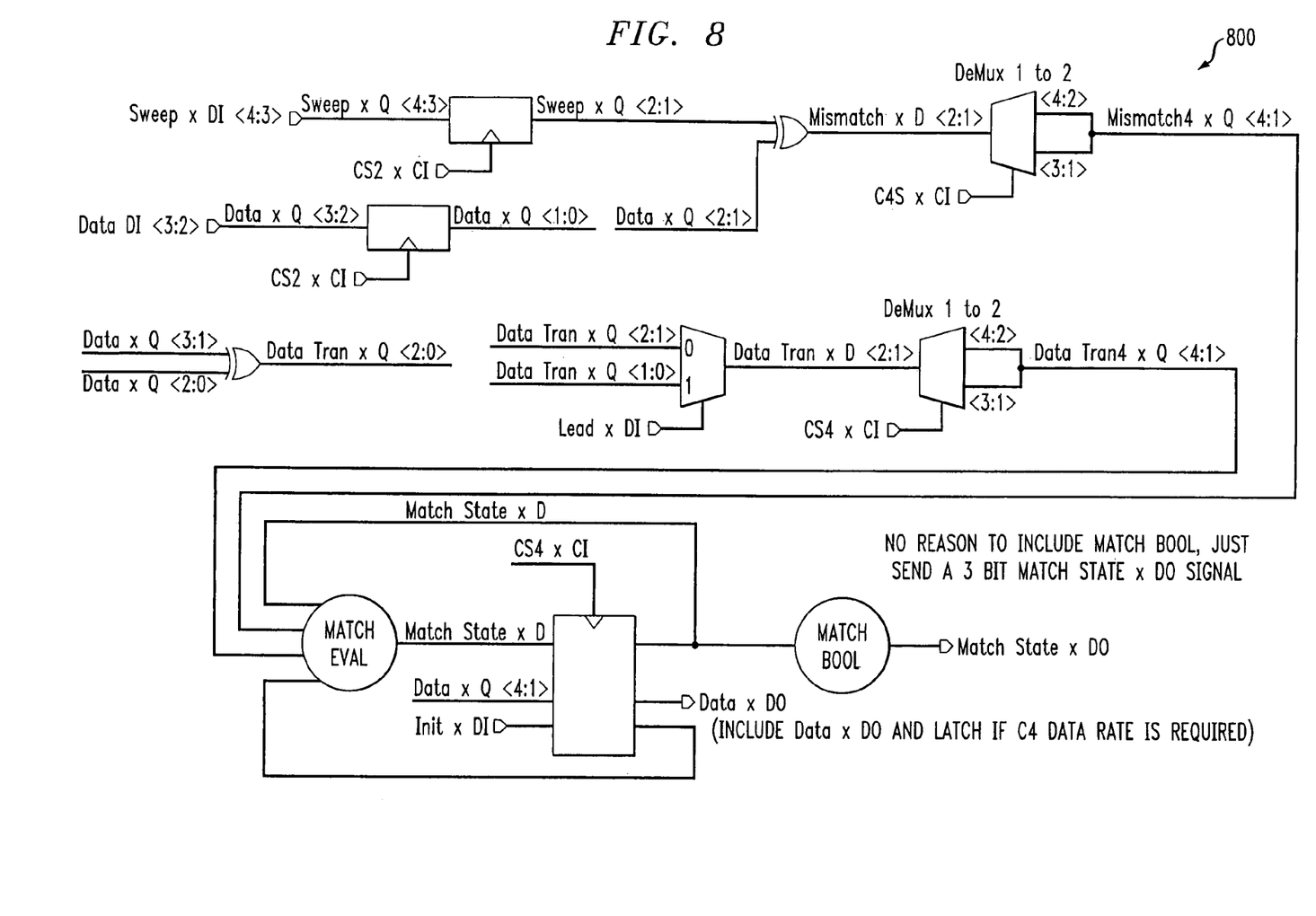
FIG. 8 is a diagram illustrating details of an evaluate block and mis/match filter, according to an embodiment of the invention.

Referring now to FIG. 8, a diagram illustrates details of the evaluate block (418 in FIG. 4), according to an embodiment of the invention. In accordance with implementation 800 shown, the data and sweep results are compared to check whether they match or there is a mismatch. The implementation also checks whether there has been a transition in the data stream or not. The match signals that occur with no transition do not have any information and are not taken into account. In this stage, we also demux from half rate to quarter rate to increase the timing margin. A finite state machine (FSM) then checks the mismatch and transition signals.

One goal here is to wait at each phase location to gather statistics to declare whether we are in the middle of the eye or at the transition region. If over a certain number of bit (32 or 64, for instance), we have two or more mismatches, we declare a final mismatch (output="zero") and we proceed to the next phase step of the sweep. If we receive at least one transition and no mismatch, we declare a match (output="one") and again continue the sweep to the next phase. However, if we receive only one mismatch or no transition, we stay at the same phase and repeat the measurement.

Figure 9:
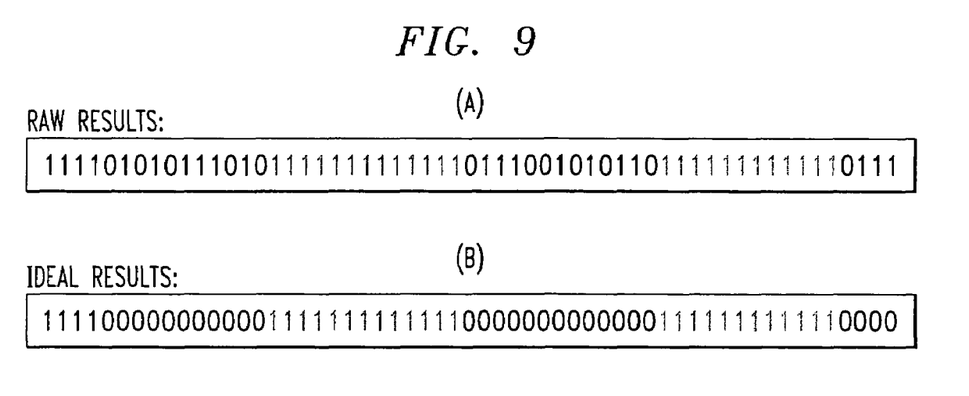
FIGS. 9A and 9B are diagrams illustrating data storable in a register, according to an embodiment of the invention.

Referring now to FIGS. 9A and 9B, diagrams illustrate data storable in a register (420 in FIG. 4), according to an embodiment of the invention. At each phase step, the output of the evaluation block shown in FIG. 8 is stored in a register. FIG. 9A shows an example of the raw results. There are regions that we have consecutive ones (matches), which correspond to the middle of the eye, and regions with a mix of zeros and ones, which correspond to transition regions. In order to have a well-defined open-eye and transition region, we filter out the "one" results that show up in the transition region and create a pattern similar to what is shown in FIG. 9B. Such filtering may be done via filter 422 in FIG. 4.

In order to do so, we define the parameter "k," which shows the minimum number of consecutive "ones" required to declare a region as an eye-opening and basically keep those ones intact. However, if the consecutive ones are less than "k," we force them to zero as shown in FIG. 9B where k is chosen to be 4.

Figure 10A:
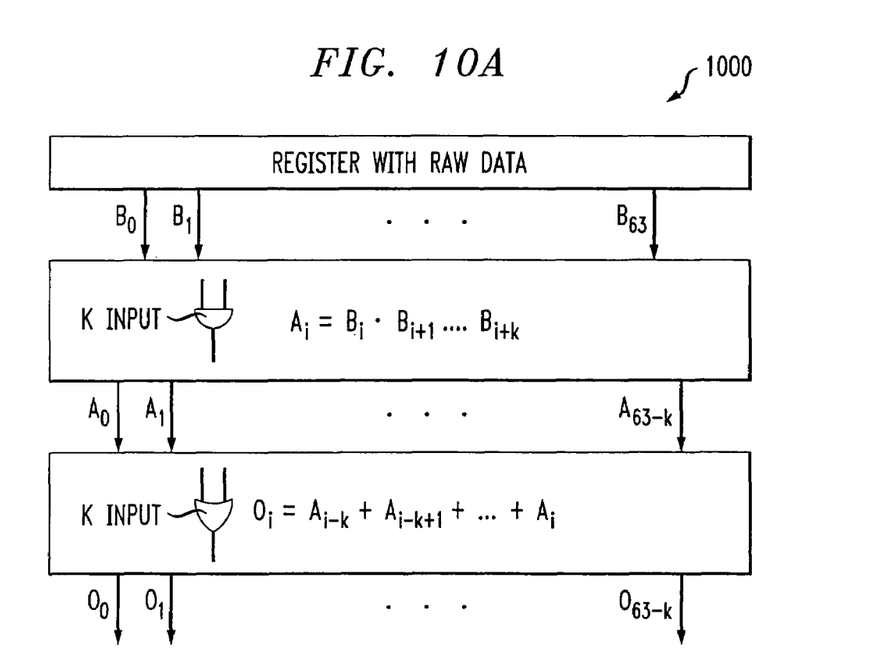
FIGS. 10A and 10B are diagrams illustrating respective implementations for filtering the raw data in FIG. 9A to obtain the ideal data of FIG. 9B.
Figure 10B:
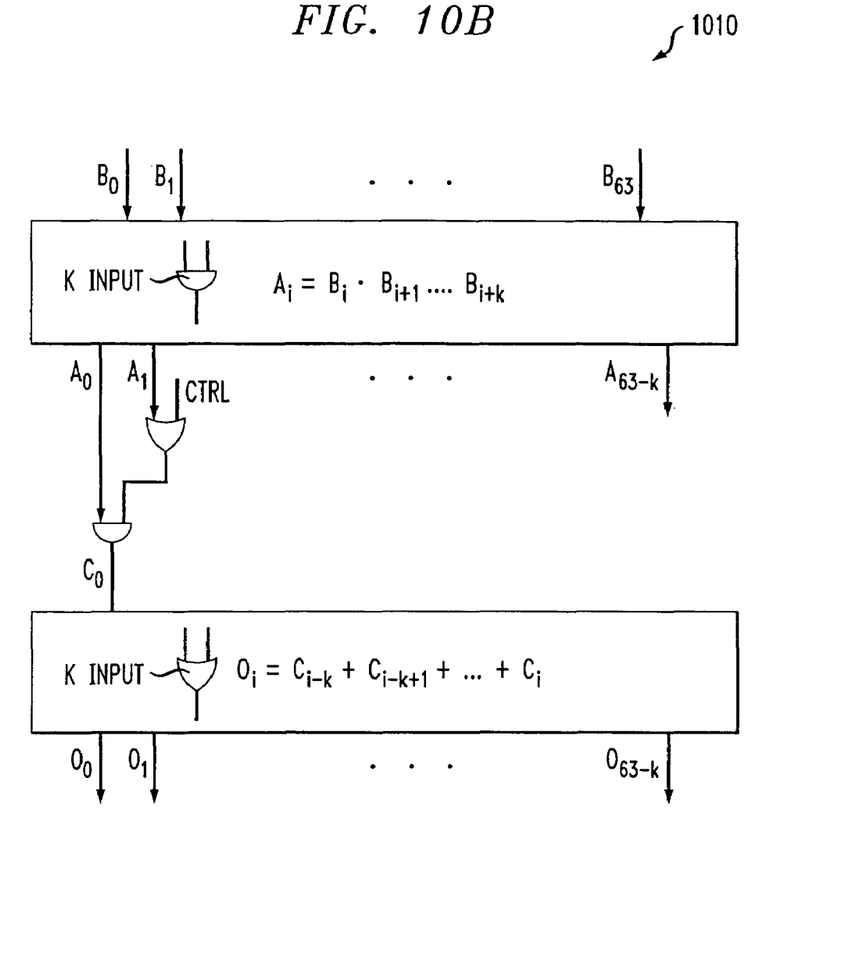

Referring now to FIGS. 10A and 10B, diagrams illustrate respective implementations for filtering the raw data in FIG. 9A to obtain the ideal data of FIG. 9B. As shown, implementations 1000 and 1010 accomplish this simply by arrays of AND and OR gates. FIG. 10A shows an implementation for a fixed k, while FIG. 10B shows a programmable filter implementation where k can be set to a target value (via "ctrl" signal), depending on the signal and channel quality.

Figure 11:
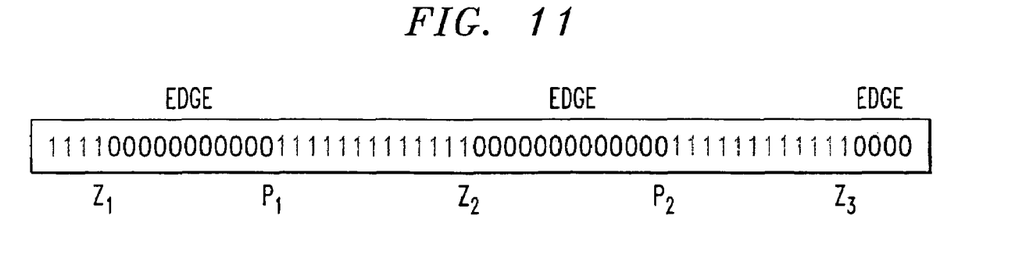
FIG. 11 is a diagram illustrating a process for choosing the best sampling point for data recovery given the results of FIG. 10B.

Referring now to FIG. 11, a diagram illustrates a process for choosing the best sampling point for data recovery given the results of FIG. 10B. This may be done in FSM 424 (FIG. 4). From FIG. 11, it is clear that we would like to find the middle point of the first "complete" mismatch-free region, meaning in the middle of P1 and Z2, where P is wherever we have a 0 to 1 transition in the pattern and Z is when we have a 1 to 0 transition. Note that the term "complete" here emphasizes that the mismatch-free region is embraced by two transition regions at the two sides of it. Take as an example: 1111000001111111100001111. The first four ones are not considered as complete since we do not see any zero before that, thus the following 7-one region is the first "complete" mismatch-free region. A conventional priority encoder circuit can be used to find P1 and Z2 and thus the middle point where the clock will be set. The proper code corresponding to that phase is send to the interpolator (412, 414 in FIG. 4) to create the proper clock phase.

It should be understood that the components/steps illustrated in FIGS. 1 through 11 may be implemented in various forms of hardware, software, or combinations thereof, e.g., one or more digital signal processors with associated memory, application specific integrated circuit(s), functional circuitry, one or more appropriately programmed general purpose digital computers with associated memory, etc. Given the teachings of the invention provided herein, one of ordinary skill in the related art will be able to contemplate other implementations of the elements of the invention.

It is to be appreciated that the receiver architecture of the invention is particularly advantageous for advanced CMOS technologies with minimum feature sizes of 90 nanometers and below for achieving very high data rates (10 Gigabit/second and higher), both in bulk and SOI (Silicon on Insulator) technologies, where building fast analog components such as PLLs and DLLs is very challenging.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method of synchronizing a clock for use in recovering received data, comprising the steps of:

setting a first clock to a fixed phase position within a given unit interval in the received data, wherein the first clock remains set to the fixed phase position within the given unit interval in the received data during a first sampling cycle, wherein the first sampling cycle comprises sweeping a second clock through other phase positions with respect to the fixed phase position of the first clock such that a transition from the given unit interval to another unit interval in the received data is determined;

determining a sampling point based on measurements at the other phase positions through which the second clock is swept during the first sampling cycle; and setting the second clock to a phase position corresponding to the sampling point such that data may be recovered at that sampling point.

2. The method of claim 1, further comprising a next sampling cycle during which the second clock remains set to the phase position corresponding to the sampling point in the first sampling cycle, wherein the next sampling cycle comprises using the first clock to sweep through phase positions with respect to the set phase position of the second clock corresponding to the sampling point in the first sampling cycle such that a next sampling point may be determined.

3. The method of claim 1, wherein the clock used to sweep across phase positions is sweepable over about two unit intervals.

4. The method of claim 1, further comprising the step of generating the first and second clock from a clock received with the data.

5. The method of claim 4, wherein generation of each of the first clock and the second clock comprises the steps of:
   generating via a delay line equally spaced clock phases over about two unit intervals;
   selecting via a multiplexer two consecutive coarse phases from the equally spaced clock phases;
   generating via an interpolator a fine phase from the two selected coarse phases such that the clock is generated at the fine phase.

6. The method of claim 4, wherein generation of each of the first clock and the second clock comprises the step of generating a fine phase using a fine-tuned, adjustable delay element in the clock path.

7. The method of claim 5, further comprising the step of latching the received data in accordance with each of the generated clocks.

8. The method of claim 7, further comprising the step of evaluating sample data obtained with the second clock with respect to sample data obtained with the first clock to determine whether the phase position of the sweeping second clock is within an open eye region or at a data bit transition region.

9. The method of claim 8, wherein the edge of the unit interval is determined to be the point where the sample data obtained with the first clock is different from the sample data obtained with the second clock.

10. The method of claim 9, further comprising the step of switching a polarity of the second clock when the edge of the given unit interval is determined.

11. The method of claim 10, wherein, in a half rate architecture, half-rate true and complement clocks are used for data recovery.

12. The method of claim 1, wherein the step of determining the sampling point further comprises determining the middle of a substantially mismatch-free region based on measurements at the phase positions associated with the second clock.

13. Apparatus for use in a data receiver for synchronizing a clock to recover received data, comprising:
   processing means for setting a first clock to a fixed phase position within a given unit interval in the received data, wherein the first clock remains set to
   the fixed phase position with the given unit interval in the received data during a first sampling cycle;
   processing means for performing the first sampling cycle, wherein the first sampling cycle comprises sweeping a second clock through other phase positions with respect to the fixed phase position of the first clock such that a transition from the given unit interval to another unit interval in the received data is determined;
   processing means for determining a sampling point based on measurements at the other phase positions through which the second clock is swept during the first sampling cycle; and
   processing means for setting the second clock to a phase position corresponding to the sampling point such that data may be recovered at that sampling point.

14. The apparatus of claim 13, further comprising processing means for performing a next sampling cycle during which the second clock remains set to the phase position corresponding to the sampling point in the first sampling cycle, wherein the next sampling cycle comprises using the first clock to sweep through phase positions within the next sampling cycle with respect to the set phase position of the second clock corresponding to the sampling point in the first sampling cycle such that a next sampling point may be determined.

15. The apparatus of claim 13, wherein the clock used to sweep across phase positions is sweepable over about two unit intervals.

16. The apparatus of claim 13, further comprising processing means for generating the first and second clock from a clock received with the data.

17. The apparatus of claim 13, wherein the processing means for determining the sampling point further comprises processing means for determining the middle of a substantially mismatch-free region based on measurements at the phase positions associated with the second clock.

18. A data receiver, comprising:
   circuitry means for setting a first clock to a fixed phase position within a given unit interval in data received by the data receiver, wherein the first clock remains set to the fixed phase position with the given unit interval in the received data during a first sampling cycle;
   circuitry for performing the first sampling cycle, wherein the first sampling cycle comprises sweeping a second clock through other phase positions with respect to the fixed phase position of the first clock such that a transition from the given unit interval to another unit interval in the received data is determined;
   circuitry for determining a sampling point based on measurements at the other phase positions through which the second clock is swept during the first sampling cycle; and
   circuitry for setting the second clock to a phase position corresponding to the sampling point such that data may be recovered at that sampling point.

19. The data receiver of claim 18, further comprising circuitry for performing a next sampling cycle during which the second clock remains set to the phase position corresponding to the sampling point in the first sampling cycle, wherein the next sampling cycle comprises using the first clock to sweep through phase positions with respect to the set phase position of the second clock corresponding to the sampling point in the first sampling cycle such that a next sampling point may be determined.

20. The data receiver of claim 18, wherein the circuitry for determining the sampling point further comprises circuitry for determining the middle of a substantially mismatch-free region based on measurements at the phase positions associated with the second clock.

* * * * *

UNITED STATES PATENT AND TRADEMARK OFFICE
CERTIFICATE OF CORRECTION

| | | |
|---|---|---|
| PATENT NO. | : 7,602,869 B2 | Page 1 of 1 |
| APPLICATION NO. | : 11/193868 | |
| DATED | : October 13, 2009 | |
| INVENTOR(S) | : Emami-Neyestanak et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 904 days.

Signed and Sealed this

Fifth Day of October, 2010

David J. Kappos
*Director of the United States Patent and Trademark Office*